United States Patent
Pfister et al.

(10) Patent No.: US 7,218,022 B2
(45) Date of Patent: May 15, 2007

(54) LINEAR ACTUATOR

(75) Inventors: Jean-François Pfister, Sonceboz (CH); Pierre Gandel, Montfaucon (FR)

(73) Assignee: Société Industrielle de Sonceboz, S.A., Sonceboz (CH)

(*) Notice: Subject to any disclaimer, the term of this patent is extended or adjusted under 35 U.S.C. 154(b) by 188 days.

(21) Appl. No.: 11/032,748

(22) Filed: Jan. 11, 2005

(65) Prior Publication Data

US 2005/0173994 A1 Aug. 11, 2005

(30) Foreign Application Priority Data

Feb. 9, 2004 (FR) .................................. 04 01229

(51) Int. Cl.
- H02K 7/06 (2006.01)
- H02K 37/24 (2006.01)
- F16H 25/20 (2006.01)

(52) U.S. Cl. .................. 310/80; 310/20; 310/68 B; 310/49 R; 310/DIG. 3

(58) Field of Classification Search ............. 310/49 R, 310/80, 68 B; 74/89.33, 89.44
See application file for complete search history.

(56) References Cited

U.S. PATENT DOCUMENTS

| 4,987,822 A | 1/1991 | Stoll |
| 5,041,748 A * | 8/1991 | Huber .................. 310/80 |
| 5,086,861 A * | 2/1992 | Peterson ................ 180/445 |
| 5,313,125 A * | 5/1994 | Bosman et al. .......... 310/49 R |
| 5,491,633 A * | 2/1996 | Henry et al. ............ 701/36 |
| 5,598,043 A * | 1/1997 | Hirano et al. ........... 310/12 |
| 5,634,373 A | 6/1997 | Cuffe et al. |
| 6,038,127 A * | 3/2000 | Ries .................... 361/680 |
| 6,211,591 B1 * | 4/2001 | Kowalski et al. ......... 310/80 |
| 6,309,094 B1 | 10/2001 | Woerner |
| 6,641,292 B2 | 11/2003 | Miki et al. |
| 2003/0005785 A1 | 1/2003 | Ung et al. |
| 2005/0218727 A1 * | 10/2005 | Gandel et al. ........... 310/12 |

FOREIGN PATENT DOCUMENTS

| DE | 19802023 | 8/1998 |
| DE | 10059677 | 6/2002 |
| DE | 10131098 | 1/2003 |
| EP | 0605283 | 7/1994 |
| EP | 0663321 | 7/1995 |
| FR | 2787863 | 6/2000 |
| FR | 2817518 | 6/2002 |

* cited by examiner

*Primary Examiner*—Burton Mullins
(74) *Attorney, Agent, or Firm*—Clifford W. Browning; Krieg DeVault LLP

(57) ABSTRACT

A linear actuator for displacing a member or a set of movable members, having an electric stepping motor (7) with a rotor having a portion in the form of a nut (9), and a linear-movement screw (12) engaging the nut portion of the rotor. The screw has a coupling portion (19) disposed at an extremity and intended to engage a coupling portion (5) of the movable member to be displaced.

9 Claims, 2 Drawing Sheets

LINEAR ACTUATOR

The present invention relates to a linear actuator, in particular an actuator comprising a motor with a rotor in the form of a nut engaging a linear-movement screw.

Linear actuators of the above-mentioned type are used in many applications, such as for controlling valves and moving machine components or robots, to cite only a few examples thereof.

In applications where the linear actuator is used for positioning a movable element with respect to a support, it is normal to provide a position detector mounted on the movable element in order to detect its position with respect to the support, this sensor being connected to a unit controlling the motor.

Although mounting a sensor on the movable element allows precise positioning of this element, the interconnections and the separate mounting of components forming the positioning system have a negative influence on the reliability of the system. Capturing the position of the movable element can also be a drawback in cases where there is a certain amount of play between the member and the linear actuator, when it is wished to fix a reference position around which a certain amount of play would be acceptable. In the case of capturing the direct position of the movable member, it is difficult to find the reference position around which a certain amount of play is permitted, since the movable member could be situated at one end or the other of the play range.

One drawback of many actuators is that they are coupled to members to be moved through one or more articulations extending generally in line with the axis of the screw, in particular in applications where the linear actuator is used for pivoting a movable member. These intermediate elements increase the play and the cost of the devices.

Another drawback of many linear actuators is that the linear-movement screw is not well-protected from its environment, in particular with respect to soiling or an interference with objects or debris outside the actuator.

In the light of the aforementioned drawbacks, an object of the invention is to provide a positioning system with a linear actuator which is reliable and economical. It is advantageous to provide an actuator which is compact and easy to install.

It is advantageous to provide an actuator able to define a reference position precisely.

It is advantageous to provide an actuator intended to make a movable member pivot and which is compact, precise and protected from its environment.

Objects of the invention are achieved by the linear actuator according to claim 1.

In the present invention, a linear actuator for displacing a movable member or a set of movable members comprises an electric stepping motor and a screw and nut system having a coupling part disposed at one of its ends and intended to engage a coupling part of the movable member to be displaced, characterized in that it comprises a position sensor having a part mounted in a casing of the actuator and another part mounted on the coupling part of the screw and nut system.

The position sensor can for example be a sensor detecting a median position of the travel of the coupling part of the screw and having for example a Hall effect element mounted in the casing of the actuator and a magnet with one or more segments mounted in the coupling part of the screw. The magnet preferably has two segments with opposite polarities, the interface between the two segments forming the median reference position detected by the Hall element.

The electrical terminals connected to the sensor, as well as to the motor windings, can advantageously be integrated in a connector for the connection of the actuator to a complementary connector connected to a control unit, or directly connected to a printed circuit of the control unit, disposed on or forming the actuator support.

For applications for pivoting a movable member with respect to a support, the casing of the actuator can advantageously comprise a longitudinal slot disposed along the linear screw in order to allow direct access of the movable member for coupling it to the coupling part of the screw and nut system.

The direct transverse access of part of the movable member to be pivoted reduces the number of parts and the play, and affords a compact configuration. A slot on each side of the linear screw can be provided, so as to make the actuator symmetrical and usable for engaging a movable member in orientations of the motor and of the linear screw at 0° and at 180°. It is also possible to provide a single longitudinal slot, disposed on the top of the casing with respect to the support on which the actuator is mounted.

Advantageously, the integration of a reference position sensor directly in the actuator casing and on the coupling part of the screw and nut system makes it possible to reliably define a reference position of the movable member, with a compact and simple actuator. The integration of the terminals of the sensor in a common connector comprising terminals connected to the windings of the motor simplifies the connection of the system to the control unit in a compact configuration. The direct engagement of the movable member at the end of the screw through the slot in the casing makes it possible firstly to provide a certain amount of protection for the movable parts of the actuator from the environment whilst reducing the number of parts and articulations which could increase the play, as well as the costs and complexity of the system.

Other objects and advantageous aspects of the invention will emerge from the claims, from the detailed description below and from the accompanying drawings, in which:

Figure 1:
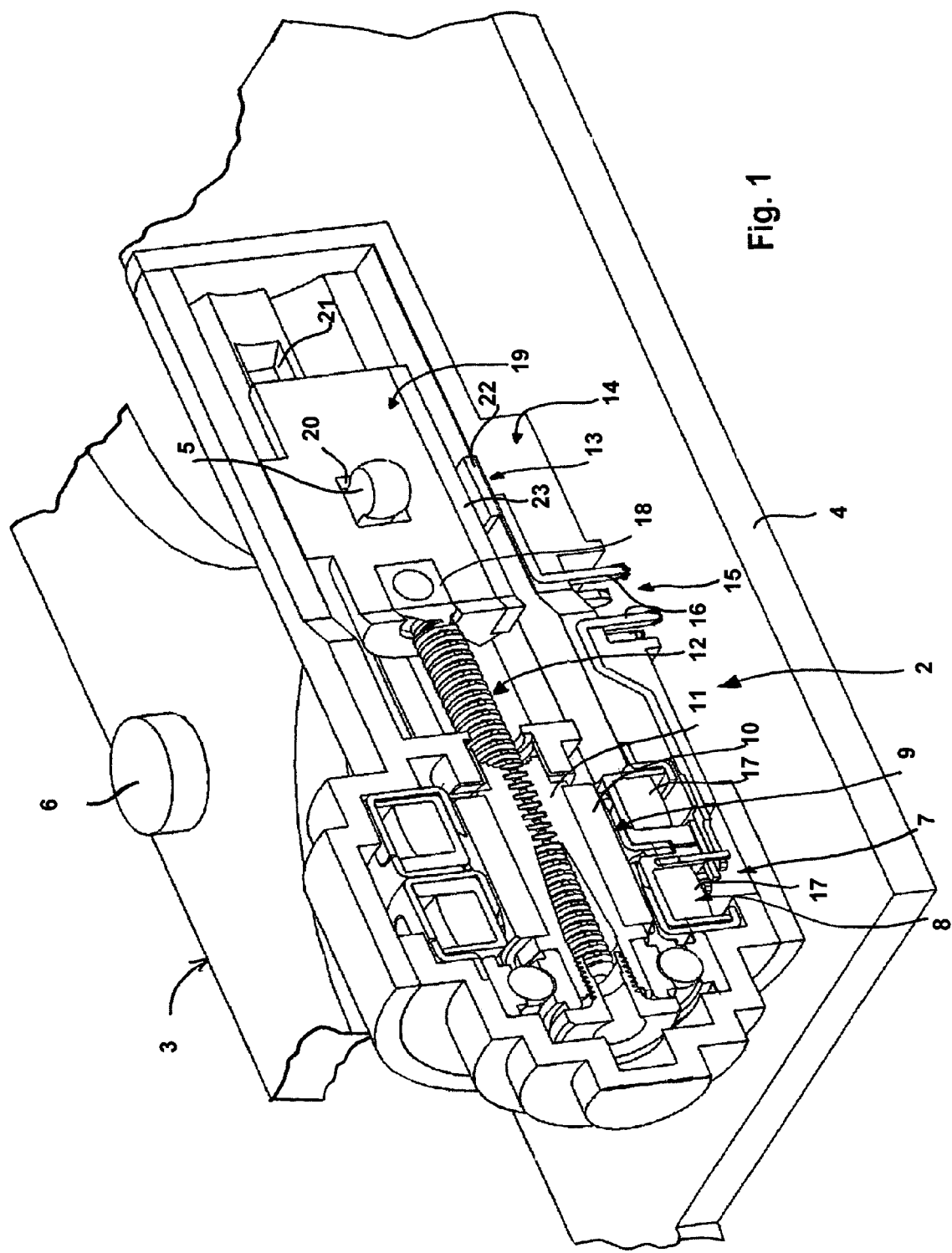
FIG. 1 is a perspective view in section of a linear actuator according to the invention, mounted on a support and engaging part of a movable member.
Figure 2:
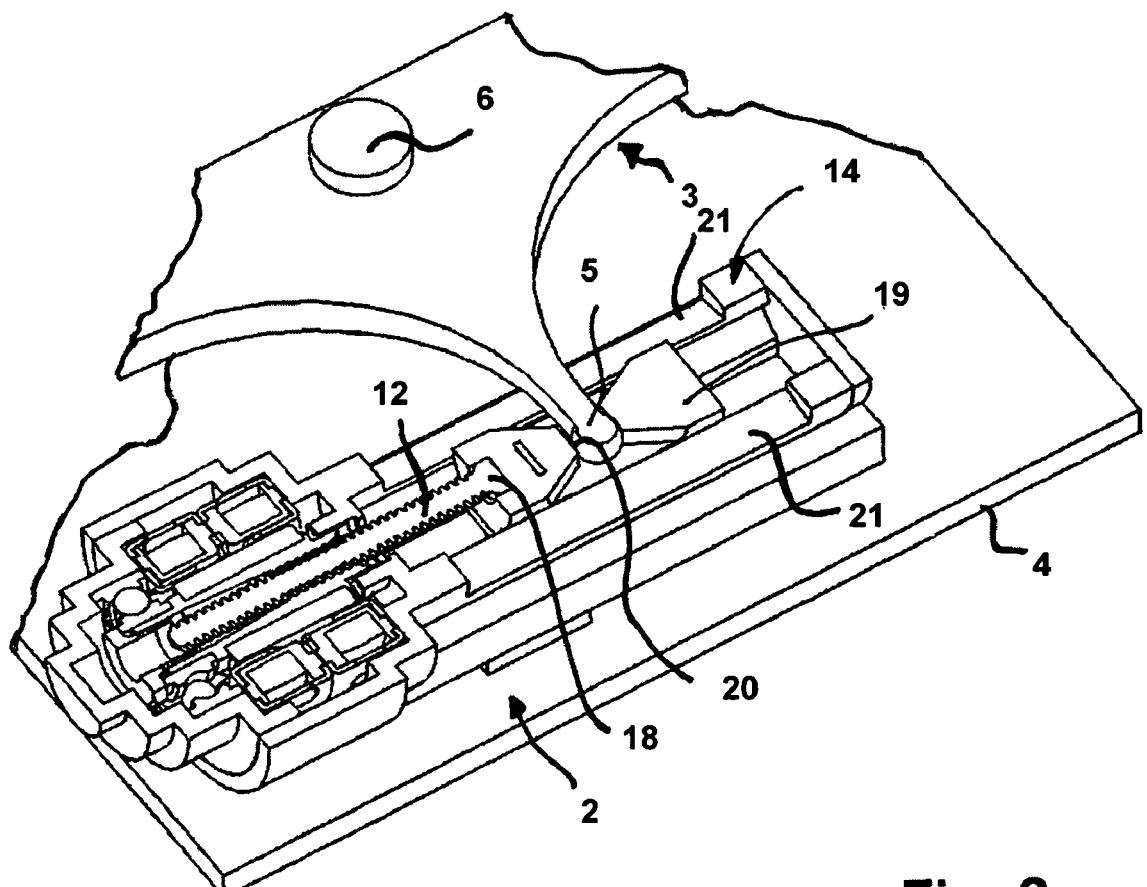
FIG. 2 is a perspective view, along another section, of the actuator according to the invention.

Referring to the figures, a positioning system is illustrated, comprising a linear actuator 2 for moving a movable member 3, in this example for rotating the movable member 3 about a pivot shaft 6 fixed to a support 4.

The actuator 2 comprises a stepping motor 7 with a wound stator part 8 and a rotor 9 with permanent magnets 10 and a nut portion 11, a linear-movement screw 12 engaging the nut portion of the rotor, a position sensor 13 and a housing 14 in which the motor, the linear-movement screw and the sensor are mounted. The actuator also comprises a connector 15 formed integrally with the housing and comprising electrical terminals 16 connected on the one hand to the stator windings 17 of the motor and on the other hand to the position sensor 13.

At an opposite end 18 of the motor, the linear-movement screw is fixed to a coupling portion 19, in this example made from a plastic material fixed or moulded onto the end of the screw, and mounted so as to be able to slide longitudinally in the casing 14. The coupling portion 19 has a non-axisymmetric shape in order to block the rotation of this part as well as of the screw. The coupling portion also comprises, in this example, a housing 20 in which the coupling part 5 of the movable member 3 is housed.

In the context of the invention, it is also possible to have a screw and nut system where the screw comprises a rotor part, driven in rotation by the stepping motor, and a linear-movement nut which comprises the coupling portion. The screw is therefore mounted on bearings to allow its rotation and the blocking of its linear movement, whilst the nut is mounted so as to be able to slide in the housing, its rotation being blocked.

In order to allow direct coupling between the movable member and the coupling portion, the housing is provided with a longitudinal slot 21. The motor, screw, sensor and the coupling part are thus protected from the external environment by the housing.

Advantageously, the actuator according to the invention forms a compact unit, integrating the functions of driving and positioning a coupling part in a reference position, the motor and the sensor of the unit being able to be connected with a single connector to the control unit.

In addition, the insertion of a coupling portion of the movable member through a slot in the actuator housing and its direct coupling with a portion integral with the linear screw make it possible to minimise play as well as the number of components, whilst having a screw protected from its environment. The transverse coupling of the movable member 5 with respect to the coupling portion 19 is particularly advantageous for applications where the movable member 13 pivots about an axis 6. In this case, the plastics material, such as Teflon or Nylon, of the coupling portion 19 of the linear screw makes it possible to have a housing shape 20 adapted to the shape of the coupling portion of the movable member, in order to reduce friction and wear and to dampen vibration and shocks.

The reference position sensor can comprise a Hall effect sensor 22 mounted inside the actuator housing and connected to electrical terminals 16 of the connector. The sensor may also comprise a magnet 23 with two juxtaposed segments of opposite polarity, the interface between the two segments defining the reference position with respect to the Hall effect element. The Hall element detects the change in direction of the magnetic field and the mid-point between the segments when it is directly facing the Hall element. The position detection according to the aforementioned principle is already known per se and used in various systems. In the context of this invention, it is also possible to integrate other sensors or position detectors, and even detectors of the switch or toggle type.

The invention claimed is:

1. A linear actuator comprising a housing (14), a stepping motor (7) and a screw and nut system (9, 12) driven by the motor and having at one end a coupling portion (19) for engaging a complementary coupling portion (5) of a movable member to be positioned (3), the coupling portion (19) being mounted slidably in the housing and being non-axisymmetric in order to stop the rotation of the screw, wherein the actuator further includes a position sensor (13), the sensor comprising a Hall effect sensor (22) mounted in the housing and connected to electrical terminals (16) of a connector (15) of the actuator, and a complementary element (23) mounted on the coupling portion of the screw and nut system and defining a reference position with respect to the element (22) mounted in the housing, the Hall effect sensor being mounted in an essentially central position between limit positions of the travel of the coupling portion of the screw and nut system.

2. An actuator according to claim 1, wherein windings of the stepping motor are connected to electrical terminals arranged in a housing portion of the connector, said connector housing portion being integrally formed with the housing of the actuator.

3. An actuator according to claim 1, wherein the housing comprises a longitudinal slot allowing access by the coupling portion of the movable member directly into a housing portion of the housing in which the coupling portion of the screw and nut system is slidably mounted, the coupling portion of the screw system being in direct engagement with the coupling portion of the movable member.

4. An actuator according to claim 1, wherein the screw and nut system comprises a linear-movement screw and a nut, whereby the nut forms part of a rotor of the motor.

5. An actuator according to claim 4, wherein the coupling portion of the screw and nut system is made of a plastic material molded or fixed to an end of the linear-movement screw.

6. A linear actuator comprising a housing (14), a stepping motor (7) and a screw and nut system (9, 12) driven by the motor and having at one end a coupling portion (19) for engaging a complementary coupling portion (5) of a movable member to be positioned (3), the coupling portion (19) being mounted slidably in the housing and being non-axisymmetric in order to stop the rotation of the screw, wherein the actuator further includes a position sensor (13), the sensor comprising an element (22) mounted in the housing and connected to electrical terminals (16) of a connector (15) of the actuator, and a complementary element (23) mounted on the coupling portion (19) of the screw and nut system and defining a reference position with respect to the element (22) mounted in the housing (14) and wherein the housing comprises a longitudinal slot (21) allowing access by the coupling portion (5) of the movable member directly into a housing (14) portion of the housing in which the coupling portion (19) of the screw and nut system is slidably mounted, the coupling portion (5) of the screw system being in direct engagement with the coupling portion of the movable member.

7. An actuator according to claim 6, wherein windings of the stepping motor are connected to electrical terminals arranged in a housing portion of the connector, said connector housing portion being integrally formed with the housing of the actuator.

8. An actuator according to claim 6, wherein the screw and nut system comprises a linear-movement screw and a nut, whereby the nut forms part of a rotor of the motor.

9. An actuator according to claim 8, wherein the coupling portion of the screw and nut system is made of a plastic material molded or fixed to an end of the linear-movement screw.

* * * * *